United States Patent [19]
Kimura et al.

[11] Patent Number: 5,111,383
[45] Date of Patent: May 5, 1992

[54] APPARATUS FOR RECOVERING SEQUENTIALLY CONTROLLED APPARATUS

[75] Inventors: Katsunori Kimura; Shinichi Hata; Yoshitaka Nishimura, all of Hiroshima, Japan

[73] Assignee: Mazda Motor Corporation, Hiroshima, Japan

[21] Appl. No.: 412,820

[22] Filed: Sep. 27, 1989

[30] Foreign Application Priority Data

Sep. 30, 1988 [JP] Japan .................. 63-248699

[51] Int. Cl.⁵ .................. G06F 15/46; G05B 23/02
[52] U.S. Cl. .................. 364/184; 318/563; 364/474.19; 364/551.02
[58] Field of Search .................. 364/184–187, 364/140–147, 474.16, 474.19, 136, 551.01, 551.02; 318/563–565; 371/29.1

[56] References Cited

U.S. PATENT DOCUMENTS

| | | | |
|---|---|---|---|
| 4,521,847 | 6/1985 | Ziehm et al. | 364/184 |
| 4,638,227 | 1/1987 | Katayama et al. | 364/184 X |
| 4,751,652 | 6/1988 | Kiya et al. | 364/184 X |
| 4,947,349 | 8/1990 | Munenaga et al. | 364/184 X |

FOREIGN PATENT DOCUMENTS

62-75548 5/1987 Japan .
62-192851 12/1987 Japan .
62-192853 12/1987 Japan .

*Primary Examiner*—Joseph Ruggiero
*Attorney, Agent, or Firm*—Fleit, Jacobson, Cohn, Price, Holman & Stern

[57] ABSTRACT

An automatic operation recovery system for automatically removing an operational failure caused in an apparatus whose complete operation is controlled by actuators operated in a predetermined sequence, thereby recovering the apparatus to its normal operating condition, comprises an actuator driver for controllably driving the actuators in a sequence suitable for a type of operational failure so as to remove the operational failure, a memory for accumulatively storing data of a type of operational failure and a sequence taken to remove the type of operational failure through the actuator driver and an automatic recovery controller for, when an operational failure is detected, assigning an order of priority to sequences available for removing the same type of operational failure accumulatively stored in the memory and automatically actuating the actuator driver to operate the actuators in a sequence assigned the first order of priority.

10 Claims, 6 Drawing Sheets

APPARATUS FOR RECOVERING SEQUENTIALLY CONTROLLED APPARATUS

FIELD OF THE INVENTION

The present invention relates to an apparatus for immediately recovering a sequentially controlled apparatus struck by operational failures to normal operational conditions.

BACKGROUND OF THE INVENTION

Various kinds of sequentially controlled machines, such as transfer machines, presses, processing machines, feeders, loaders, conveyer systems, etc, generally have a number of actuators sequentially operated so as to perform a sequential operation of the machine, a number of sensors for detecting actions of elements actuated by the actuators, a control system for sequentially controlling the actuators according to signals from the sensors, and a control unit including alarm lamps for alarming i.e., signalling abnormal operations or operational failures, and control buttons or switches for manually operating the actuators for removing operational failures caused in the machine.

Such a sequentially controlled machine often encounters not only troubles of various components leading to malfunction but also various, but insignificant, operational failures, such as slippage of workpieces, the ingress of dust and foreign materials in the sensors and/or the moving elements, etc. which are relatively easily removed. If such removable operational failures occur, the operator speculatively diagnoses the type of operational failure visually indicated by means of alarm lamps and enters or inputs instructions through the control unit to operate the actuators in a certain sequence so as to remove the operational failure, thereby returning or recovering the sequentially controlled apparatus to its normal operational conditions. For example, if a sequential machining apparatus accidentally stops and an alarm lamp indicates that a workpiece clamping member is left inactive against a workpiece, it is usually speculated that the workpiece is not exactly placed in a working position on a work rest. In such a case, the operator attempts to recover the ordinary activity of the workpiece clamping member by removing the workpiece from the work rest and then placing it in the working position on the work rest again.

As to detection of mulfunctions and troubles of various sequentially controlled apparatus or devices, many techniques have been proposed. For example, Japanese Unexamined Utility Model Publication No. 62-75,548 entitled "Residual Working Life Predicting Apparatus", laid open on May 14, 1987, describes a working life precomputing system in which a residual working life of an apparatus is predicted or precomputed and indicated based on a type of trouble striking the apparatus and the probability of occurrence of the type of trouble. Further, Japanese Unexamined Utility Model Publication No. 62-192,853 entitled "Numerical Control Machining Apparatus With Single CRT For Displaying Alarm List", laid open on Dec. 8, 1987, describes a numerical controlled machine in which alarm messages are displayed on a CRT in a desired language.

If an operational failure which is removable happens in the sequentially controlled apparatus or machine, the operator makes an attempt to recover the sequentially controlled machine to its normal operational conditions by actuating some of, or all of, the actuators of the sequentially controlled machine in one or more sequences experimentally adopted. If it is unsuccessful in recovering the sequentially controlled machine in the sequence taken, then the operator actuates other actuators in other sequences, generally different from the previously adopted sequences, so as to recover the sequentially controlled machine to its normal operational conditions or activities.

Because of adoptation of preferable sequences in which recovery operations are executed depending on the experiments and skill of the operator, it is not always that the operator adopts the best sequence of recovery operation for actuating the actuators of the sequentially controlled machine for recovering the sequentially controlled machine to its normal activities. Accordingly, it often takes time to remove operational failures even by a skilled operator and thereby, recovering the sequentially controlled machine to its normal activities. This leads to a lowered efficiency of use of the sequentially controlled machine.

SUMMARY OF THE INVENTION

The primary object of the present invention is to provide an automatic recovery system for recovering a sequentially controlled apparatus struck by operational failures to its normal operational conditions which has no dependence on and does not require adoption of the best sequence for removing an operational failure on an operator's skill and experiments.

The object of the present invention is achieved by providing a novel automatic operation recovery system for recovering a sequentially controlled apparatus or machine whose complete sequential operation is controlled by operating a plurality of actuators in a predetermined sequence by removing an operational failure caused in the sequentially controlled apparatus and, thereby, recovering the sequentially controlled apparatus to its normal operating condition. The automatic recovery system comprises an actuator operating means for intentionally operating the actuators in either a manual sequence or an automatic sequence suitable for a type of operational failure detected by an operational failure detecting means so as to remove the operational failure. A control unit consists of a memory means which accumulatively stores data of a type of operational failure detected by the operational failure detecting means and a sequence taken to remove the type of operational failure through the actuator operating means and an automatic recovery means for, when an operational failure is detected by the operational failure detecting means, assigning all sequences available for removing the same type of operational failure as the detected operational failure accumulatively stored in the memory an order of priority and automatically operating the actuators in a sequence assigned the first order of priority so as to remove said operational failure striking the sequentially controlled apparatus and thereby recover the sequentially controlled apparatus to its normal operating conditions.

Because every time a sequential operation is taken either manually or automatically to remove an operational failure caused in or striking the sequential controlled apparatus, data of a type of operational failure and a sequence taken to remove the type of operational failure through the actuator operating means are accumulatively stored in the memory means. Upon an occurrence of an operational failure, the automatic recovery means executes an operation to assign all sequences available for removing the same type of operational failure as the occurring operational failure whose data have been accumulatively stored in the memory an order of priority depending upon evaluation values for the sequences computed based on at least one of parameters of a probability of recovery P which is a ratio of the number of successful removals of a same type of operational failure by each said sequence relative to the total number of trials of each said sequence for said same type of operational failure, a recovery time T which is a period of time needed to successfully remove said same type of operational failure by each said sequence, and the number of operations N for actuating said actuators. Thereafter, the automatic recovery means automatically operates the actuators in a sequence assigned the first order of priority so as to remove said operational failure striking the sequentially controlled apparatus and thereby recover the sequentially controlled apparatus to its normal operating conditions.

BRIEF DESCRIPTION OF THE DRAWINGS

Still other objects of the invention and more specific features will become apparent to those skilled in the art from the following description of the preferred embodiment considered together with the accompanying drawings wherein like reference characters have been used in the different figures to denote the same parts and in which.

DESCRIPTION OF THE PREFERRED EMBODIMENT

Figure 1A:
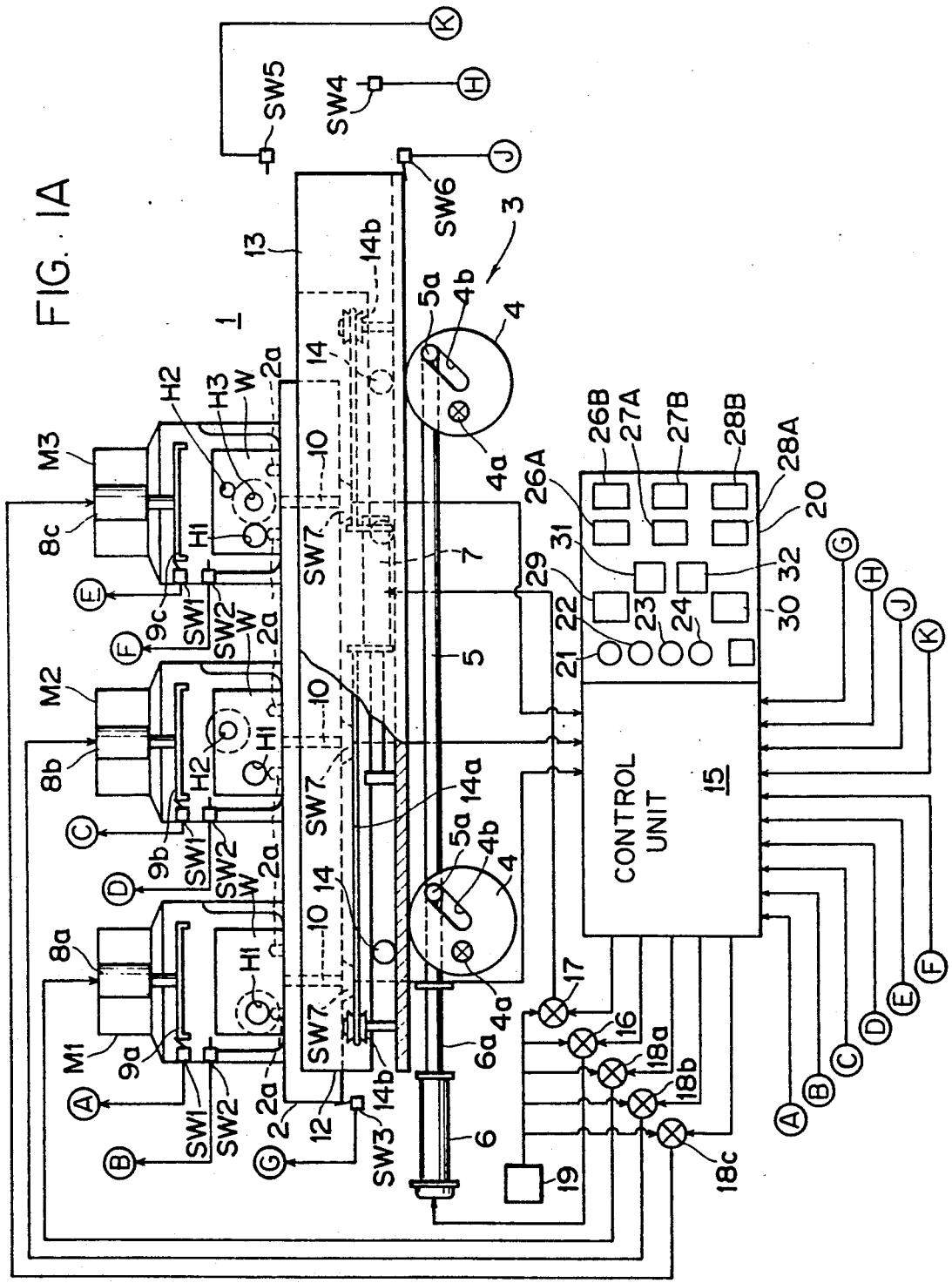
FIG. 1A is a schematic front view of a workpiece lifting and carrying apparatus in which an automatic normal operating condition recovery system in accordance with the present invention is embodied.
Figure 1B:
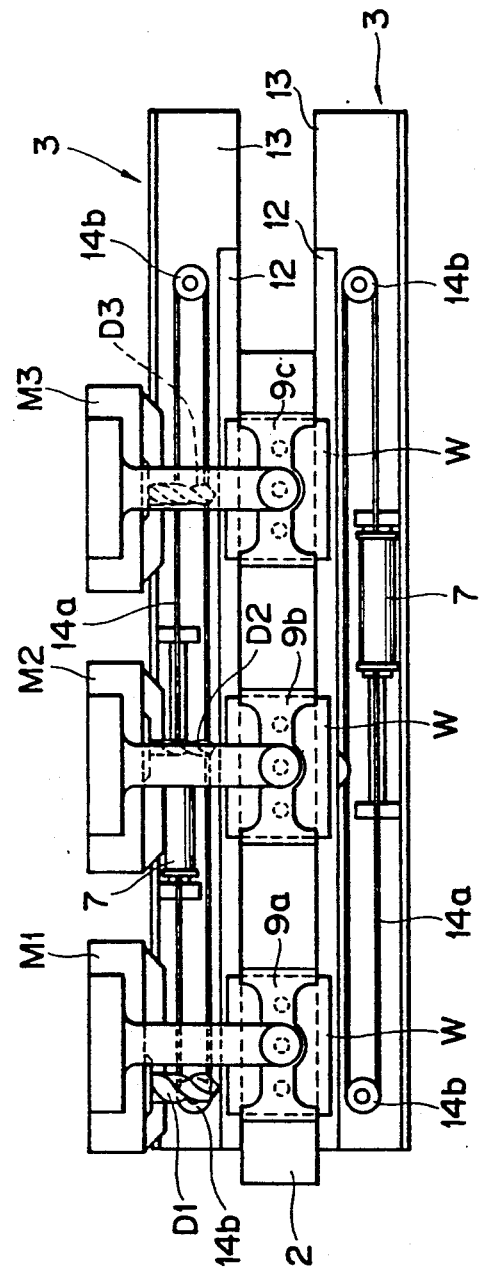
FIG. 1B is a schematic plan view of the workpiece lifting and carrying apparatus shown in FIG. 1A.
Figure 2A:
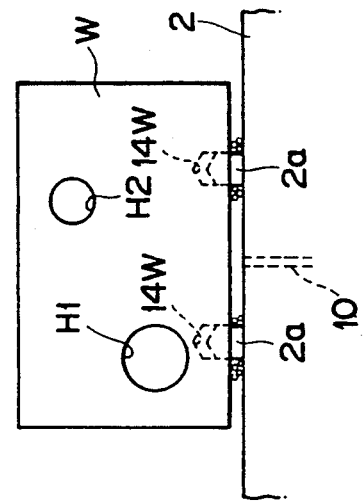
FIGS. 2A and 2B are exemplary illustrations of operational failures.

Referring to the drawings in detail, particularly to FIGS. 1A and 2A, a sequentially controlled workpiece lifting and carrying apparatus 1 incorporating an automatic recovery system in accordance with a preferred embodiment of the present invention for automatically removing an operational failure striking the sequential controlled apparatus 1, thereby recovering the normal operating condition of the sequential controlled apparatus, is shown, consisting of a stationary work table 2 which supports thereon three workpieces W so as to place them at preselected position relative to No. 1 to No. 3 machines, for example drilling machines M1-M3, arranged side by side at regular spacings in a straight line. The drilling machines M1-M3 have different diameters of drills D1-D3, respectively, for drilling horizontal through holes H1-H3 (hole H3 is not shown) in each workpiece W in order. For exactly placing the workpieces W at the preselected positions, the stationary work table 2 is provided with locating pins 2a coacting with locating holes 14w formed in the workpieces W. A carriage 3 for lifting up and then carrying the workpieces W to the right as viewed in FIG. 1 comprises lifting and carrying structures disposed on both sides of the stationary table 2. Each lifting and carrying structure consists of an inner support 12 and an outer support 13 slidable relative to each other. The outer support 13, which is formed in an L-shape in cross-section, extends in a lengthwise direction in which the stationary table 2 extends and along the stationary work table 2. The outer support 13 is lifted up by means of a pair of turn disks 4 which are rotatably mounted on fixed pins 4a at offset positions and linked by means of a connecting rod 5 integrally formed with a piston rod 6a of a hydraulic cylinder 6. Each turn disk 4 is formed with a substantially radially extending guide slot 4b which slidably receives a guide pin 5a secured to the connecting rod 5. The connecting rod 5 is horizontally, reciprocally moved by the hydraulic cylinder 6 so as to turn the turn disks 4 about the offset pins 4a. When actuating the cylinder 6 to protrude a piston rod 6a, the turn disks 4 are turned in a clockwise direction sliding the under surface of the outer support 13, thereby lifting up the carriage 3 vertically so as to push up the workpieces W.

The inner support 12 is supported on the L-shaped inner support 13 by means of rollers 14 for slidable horizontal movement relative to the outer support 13. To slidably move the inner support 12, a looped wire or belt 14a is stretched between pulleys 14b mounted on the outer support 13 and connected to the side wall of the inner support 12 and a hydraulic cylinder 7 secured to the inner wall of the outer support 13. When the hydraulic cylinder 7 is actuated, after lifting up the carriage 3, the inner support 12 is horizontally, slidably moved relatively to the outer support 13.

A control unit 15 sequentially controls the movement of the carriage 3. That is, the control unit 15 actuates the hydraulic cylinder 6 first to retract the piston rod 6a so as to turn the turn disks 4 in the counterclockwise direction, thereby lifting vertically upwardly the carriage 3. When the turn disks 4 are turned through approximately a right angle, the carriage 3 lifts up the workpieces W and disconnects them from the locating pins 2a. Then, the control unit 15 actuates the hydraulic cylinder 7 to protrude or extend the piston rod 7a so as to pull the belt 14a, thereby sliding the inner support 3 on the outer support 13 towards the right by a distance equal to the spacing at which each adjacent working machines are arranged. The drilling machines M1-M3 are actuated to drill different diameters of vertical through holes H1-H3 in the workpieces W, respectively. Thereafter, the control unit 15 actuates the hydraulic cylinder 6 and then the hydraulic cylinder 7 so as to move the carriage 3 downwardly and to the left, thereby returning it to its original position. In this manner, the last two workpieces W are shifted to face the No. 2 and No. 3 drilling machines M2 and M3 and the first workpiece W is removed from the work table 2 by means of a manipulator well known in the art. Simultaneously, another workpiece W is placed on the work table 2 in front of the No. 1 drilling machine by means of a manipulator well known in the art. The sequential movement of the carriage 3 takes place every machining the workpiece W on the work table 2.

The workpieces W placed in position on the work table 2 are clamped by No. 1-No. 3 clamping heads 9a to 9c actuated by No. 1 to No. 3 hydraulic cylinders 8a to 8c, respectively, so as to be firmly held down against the work table 2. Actuation of the No. 1 to No. 3 hyrdaulic cylinder 8a to 8c are controlled by the control unit 15.

Provided in association with the lifting and carrying apparatus 1 are various position sensors in the form of a limit switch: clamping head limit position sensors SW1 and SW2 vertically spaced and disposed along the clamping heads 9a, 9b and 9c, respectively, for detecting the clamping heads 9 at their upper and lower limit positions, carriage lengthwise limit position sensors SW3 and SW4 disposed on both ends of the carriage 3, in particular the inner support 12, for detecting the carriage 3 at the forward and rearward limit positions thereof in the lengthwise direction wherein the carriage 3 moves horizontally, carriage vertical limit position sensors SW5 and SW6 disposed near one end of the carriage 3 above and below thereof, respectively, for detecting the carriage 3 at the upper and lower limit positions thereof. The work table 2 is formed with No. 1 to No. 3 air orifices 10 opening in the upper surface of the work table 2 between the adjacent locating pins 2a. Each air orifice 10 is connected to an air pressure sensor SW7 for detecting a gap formed between the upper surface of the work table 2 and the bottom surface of the workpiece W placed on the work table 2. The control unit 15 is connected to the outputs of all of the sensors SW1-SW7 and also to the outputs provided by the working machines upon finishing machining.

The control unit 15 receives the outputs from the sensors SW1-SW7 and the drilling machines M1-M3 to, on one hand, sequentially control electromagnetic valves 16, 17 and 18a-18c connected to the hydraulic cylinders 6 and 7 of the lifting and carrying apparatus 1, electromagnetic valves 18a-18c connected to the hydraulic cylinders 8a-8c of the drilling machines M1-M3.

A control board 20 cooperating with the control unit 15 is provided with alarm lamps 21-24 for indicating types of operational failures, cylinder actuating switches 26A, 26B, 27A, 27B, 28A and 28B for actuating the hydraulic cylinders 6, 7 and 8a-8c through the valves 16, 17 and 18a-18c, respectively, a manual recovery mode selection switch 29, an automatic recovery mode selection switch 30, a recovery sequence start switch 31 and a recovery sequence terminate switch 32.

As a simple example of operational failures, in machining in the workpiece W different diameters of horizontal through holes in the workpiece W, there are possibly caused the following operational failures:

Clamp cycle over (FIG. 2A)

This operational failure is found by the fact that a predetermined time period has elapsed while any one or all of the lower clamp head limit position sensors SW2 do not detect the clamping heads 9 even though the hydraulic cylinders 8a-8c are actuated, moving down the clamping heads 9 towards the workpieces W. This type of operational failure often happens due to a misfitting of the locating pins 2a into the locating holes 14w of the workpiece W as shown in FIG. 2A.

To manually remove such a clamp cycle over failure by executing a recovery operation in a manual sequence which is referred to as a sequence I, the cylinder actuating switches 28B are operated to actuate all of the hydraulic cylinders 8a-8c so as to retract the piston rods thereof, thereby moving up all of the clamping heads 9a-9c. Thereafter, the cylinder actuating switches 26A and 26B are operated in order to actuate the hydraulic cylinder 6 so as to protrude first and then retract the piston rod 6a, thereby moving up and then down the carriage 3, and hence the workpiece W on the work table 2. Finally, the cylinder actuating switch 28A is operated to protrude the piston rods of the hydraulic cylinders 8a-8c, thereby moving down the clamping head 9 to hold down the workpieces W against the work table 2. The workpieces W are usually brought into proper fitting onto the locating pins 2a and placed in position. However, when the clamp cycle over failure is not removed as the result of a first trial of the above recovery operation in the manual sequence I, the same recovery operation as for the first trial is repeated again. If the clamp cycle over failure is as yet not removed after more than two times of trials, then, the workpiece W is correctively replaced by an operator.

Figure 2B:
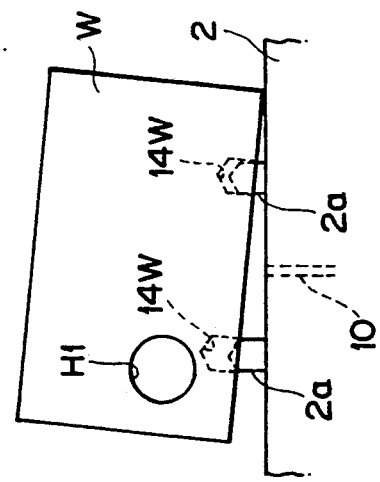

Poor contact of workpiece (FIG. 2B)

This operational failure is found by the fact that any one or all of the air pressure sensors SW7 do not detect a predetermined pressure even though the workpieces W are placed on the work table 2. Such a poor contact of workpiece often happens due to foreign articles, such as swarf of the workpieces W, attached to the locating pins 2a or the ingress of foreign articles between the working table 2 and the workpieces W.

To remove such a poor contact of workpiece by manually executing a recovery operation in a manual sequence which is referred to as a sequence II, the same manual sequence of recovery operation as for the clamp cycle over failure is taken. If the poor contact of the workpiece W is not removed, after operating the cylinder actuating switches 28A to actuate all of the hydraulic cylinders 8a-8c so as to move up the clamping heads 9, the cylinder actuating switches 26A and 26B are operated to repeat the up and down movement of the carriage 3 twice. Finally, the cylinder actuating switch 28B is operated again to move down the clamping heads 9a-9c to hold down the workpieces W against the work table 2. If the poor contact of workpieces W is as yet not removed, the lifting and carrying apparatus 1 is stopped and then foreign articles between the work table 2 and the workpieces W are blown away by air.

For automatically recovering the lifting and carrying apparatus 1 to its normal conditions, an automatic recovery sequence is stored in the recovery system. When the recovery sequence start key 31 is operated to actuate the recovery system having been set to the automatic recovery mode by operating the automatic recovery mode selection switch 30, an automatic sequence of recovery operation is executed. If the lifting and carrying apparatus 1 is not recovered by the automatic sequence of recovery operation, after selecting the manual recovery mode by means of the manual recovery mode selecting switch 29, a recovery operation is executed in sequence I or II, or otherwise in another manual sequence. As will be described in detail later, because data of all of manual sequential recovery operations previously executed are accumulatively memorized and each manual sequential recovery operation is assigned an order of priority, a recovery operation in the automatic recovery mode is automatically executed in a sequence having the first order of priority even though it has been previously executed in a manual sequence.

As an example, consider that an occurrence of clamp cycle over failure after either a clamp cycle over failure or a poor contact failure of a workpiece W has been removed by a manual recovery operation in recovery sequence I or II described above and recovery sequence II has been given an order of priority higher than recovery sequence I. Upon the occurrence of clamp cycle over failure, a recovery operation for the clamp cycle over failure is automatically executed in recovery sequence II in the automatic recovery mode. If a recovery operation in recovery sequence II fails to remove the clamp cycle over failure, and thereby resulting in no recovery of the lifting and carrying apparatus 1, then another recovery operation is executed in recovery sequence I. If even the recovery operation in recovery sequence I fails to remove the clamp cycle over failure, then, it is required to change the recovery system into the manual recovery mode and then to carry out a manual sequential recovery operation. It is to be understood that a recovery operation in recovery sequence I is of course executed first if it has the first order of priority.

There are various removable operational failures possibly caused in the lifting and carrying apparatus 1 by, for example, the ingress of foreign articles between the clamping heads 9 and the workpieces W, between the tops of the whirling arms and the under surface of the carriage 3, or between the work table 2 and the carriage 3 other than the above examples which are typical removable operational failures. For removing such operational failures, there are effective recovery sequential operations; one or two in some cases, or more than two, as the case may be.

The automatic recovery system incorporated in the lifting and carrying apparatus 1 is adapted to store data of manually effected sequences of recovery operations and automatically effected sequences of recovery operations as a sequential type of data base. Upon detecting a removable operational failure, the control unit 15 selects one or more sequences of recovery operations evaluated to be available for the detected operational failure and assigns an order of priority to the available sequences of recovery operations. In an automatic recovery mode, the control unit 15 executes the sequence of recovery operation assigned the first order of priority so as to recover the normal operating condition of the lifting and carrying apparatus 1.

Figure 3A:
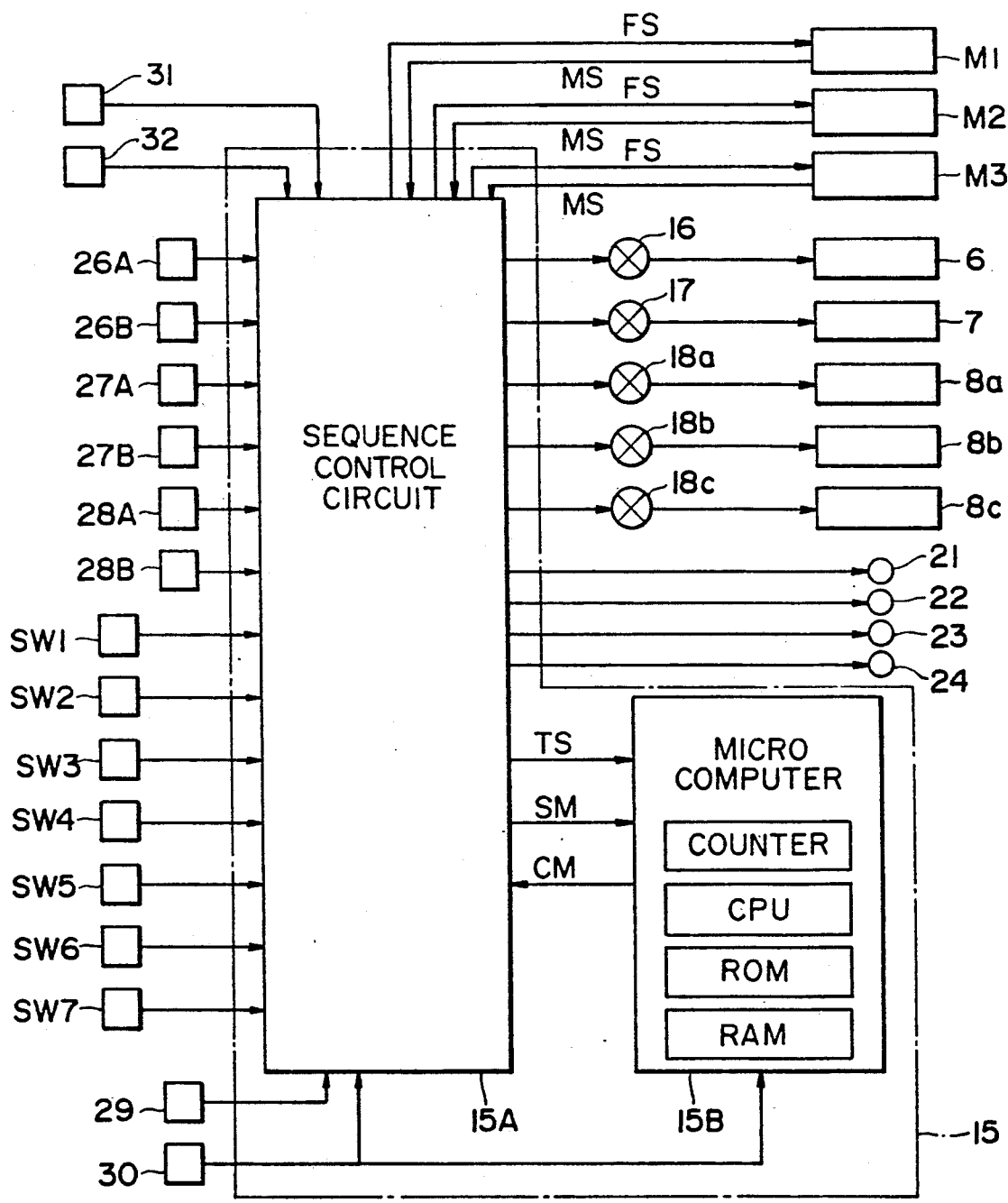
FIG. 3A is a block diagram showing a control unit of the automatic normal operating condition recovery system shown in FIG. 1A.
Figure 3B:
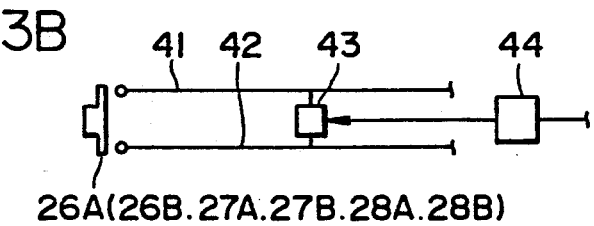
FIG. 3B is a detailed illustration of a cylinder actuating switch.

The control unit 15, of which details are illustrated in FIG. 3A, consists of first and second controllers 15A and 15B which are interconnected to transfer signals therebetween. The first controller 15A comprises a sequence control circuit for sequentially controlling the electromagnetic valves 16, 17 and 18a-18c in accordance with the type of an operational failure determined based on the output signals from the sensors SW1-SW7 and the drilling machines M1-M3. The first controller 15A is connected with the outputs of the sensors SW1-SW7, the cylinder actuating switches 26A, 26B, 27A, 27B, 28A and 28, the manual recovery mode selection switch 29, the automatic recovery mode selection switch 30, the recovery sequence start switch 31, the recovery sequence terminate switch 32, and the alarm lamps 21-24. As shown in FIG. 3B, each of the cylinder actuating switch 26A-28A and 26B-28B is connected to a normally open relay switch 43 connected between input and output lines 41 and 42 thereof in the first controller 15A. The normally open relay switch 43 is actuated to close by means of a relay actuator 44. To control the hydraulic cylinders 6, 7 and 8a-8c in accordance with instruction signals from the second controller 15B so as to recover the normal operating conditions of the lifting and carrying apparatus 1 struck by operational failures in the automatic recovery mode, the function of each cylinder actuating switch 26A-28B is substituted by the normally open relay switch 43 connected to the actuator 44. The actuator 44 is caused by an instruction signal from the second controller 15B to close the normally open relay switch 43, thereby short-circuiting the input and output lines 41 and 42.

The first controller 15A is connected to self-contained control units of the drilling machines M1-M3, so as to transfer signals MS indicating the completion of machining from the respective self-contained control units of the drilling machines M1-M3 to the second controller 15A and signals FS indicating the completion of placing workpieces W on the work table 2 from the second control unit 15B to the respective self-contained control units of the drilling machines M1-M3.

The second controller 15B mainly comprises an I/O port, a central processing unit (CPU), a read only memory (ROM), a random access memory (RAM) and a soft counter, all of which may take any well known type. The ROM of the second controller 15B previously stores an automatic recovery sequence program which will be described in detail with reference to FIGS. 4 to 6, and the RAM accumulatively stores data on the types of operational failures and sequential recovery operations by which the operational failures have been removed.

Figure 4:
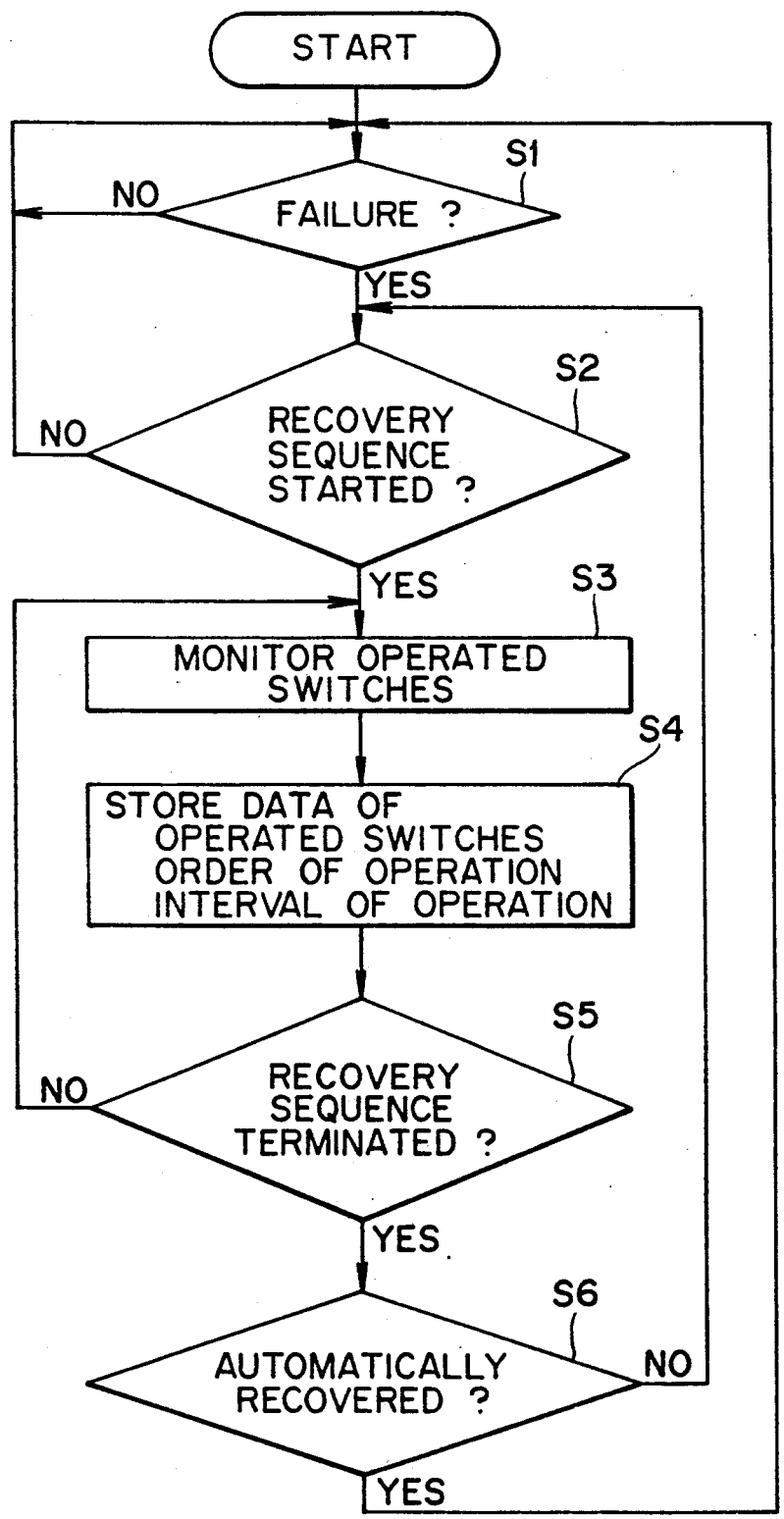
FIG. 4 is a flow chart illustrating a data collection subroutine.
Figure 5:
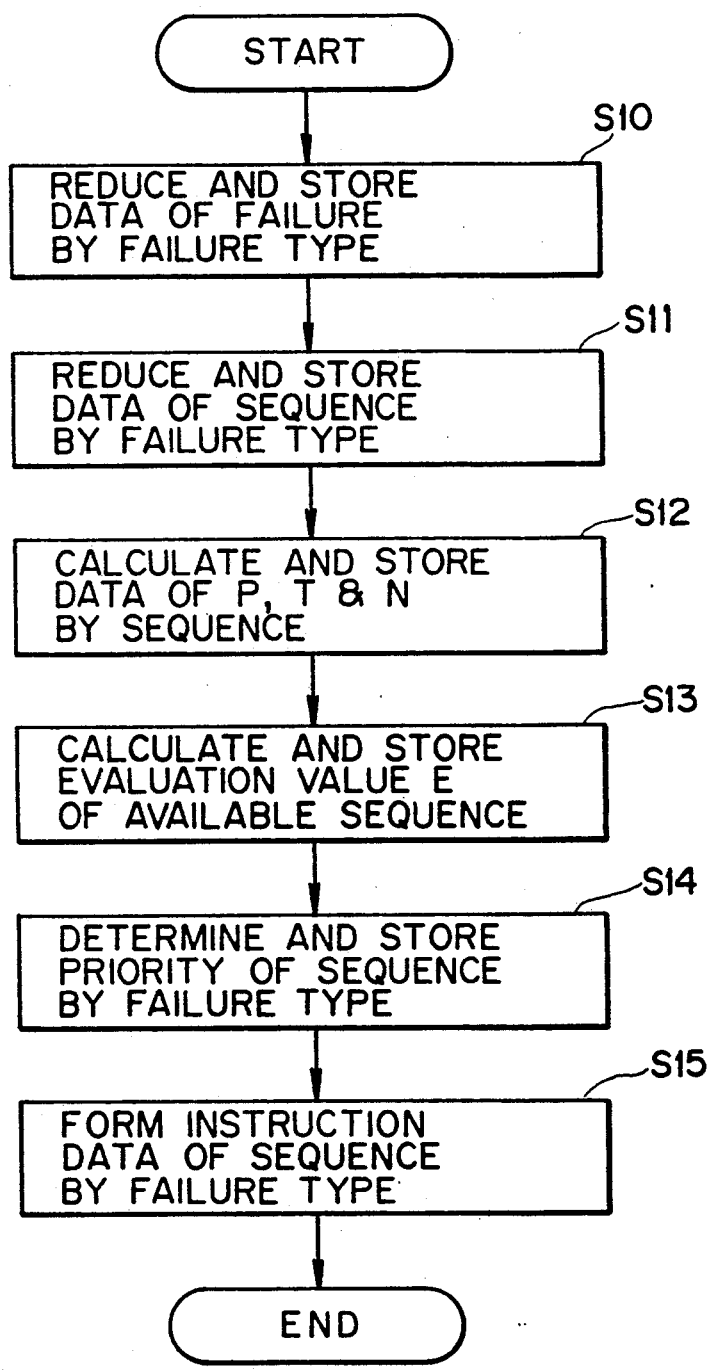
FIG. 5 is a flow chart illustrating a data evaluation subroutine.
Figure 6:
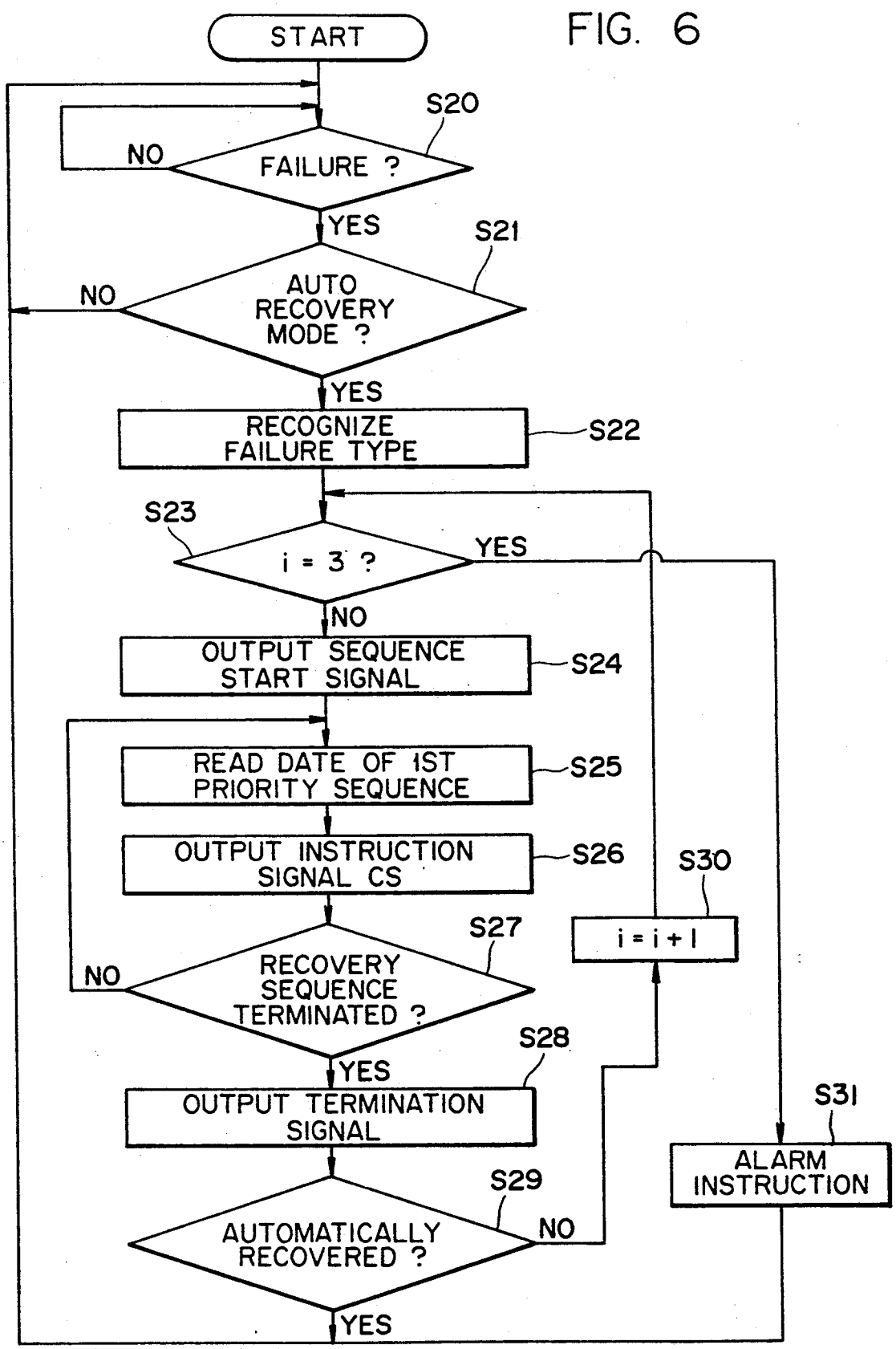
FIG. 6 is a flow chart illustrating automatic recovery routine.

The operation of the automatic recovery system of the lifting and carrying apparatus described in FIGS. 1A and 3A is best understood by reviewing FIGS. 4 to 6, which are flow charts illustrating various routines or subroutines for the microcomputer of the second controller 15B. Programming a computer is a skill well understood in the art. The following description is written to enable a programmer having ordinary skill in the art to prepare an appropriate program for the microcomputer of the second controller 15B. The particular details of any such program would of course depend upon the architecture of the particular computer selection.

Refering now to FIG. 4, which is a flow chart of the data collection subroutine starting upon the actuation of the lifting and carrying apparatus 1 and repeatedly operating as long as the lifting and carrying apparatus 1 is in operation. In the data collection subroutine, the second controller 15B receives a failure signal TS from the first controller 15A to detect the fact that an operational failure is caused in the lifting and carrying apparatus 1 and, if in fact an operational failure is detected, judges the type of the detected operational failure in step S1. Following the detection of an occurrence and the type of failure, an output from the recovery sequence start switch 31 or provided upon starting an automatic recovery sequence which will be described later is read to judge whether a recovery sequence is initiated in step S2. If the recovery sequence is initiated, the second controller 15B receives monitor signals SM from the first controller 15A provided when the cylinder actuating switches 26A-28A and 26B-28B are selectively operated for removing the operational failure so as to monitor the operations of the cylinder actuating switches 26A-28B in step S3. Then, the second controller 15B stores data of the type of the operational failure judged based on the failure signal TS and the monitor signals SM and data of the intervals of switch operations, as well as the order of operation, of the selectively operated cylinder actuating switches in the RAM thereof in step S4. After the recovery operation, the second controller 15B reads a sequence termination signal provided either from the recovery sequence terminate switch 32 or upon the termination of recovery operation in an automatic sequence to decide whether the recovery operation has been properly effected in step S5. If the recovery operation has not been terminated, then steps S3 and S4 are repeated once again.

When in fact the recovery operation has been terminated, the first controller 15A receives an actuating signal from the second controller 15B to automatically actuate the lifting and carrying apparatus 1. At this time, a decision is made in step S6 as to whether the operational failure has been removed. If the answer to the decision in step S6 is no indicating that the operational failure could not be removed in the recovery operation in the adopted sequence, then another recovery sequence of recovery operation is taken and the data collection subroutine is executed again following steps S2–S6. On the other hand, when the operational failure is eventually removed, the data collection subroutine repeats starting step S1.

In this manner, the data of types of operational failures and recovery operations taken for removing the operational failures are accumulatively stored in the RAM of the second controller 15B either in the automatic recovery mode or in the manual recovery mode. It is to be noted that the RAM of the second controller 15B stores data on whether the recovery of normal operating condition of the lifting and carrying apparatus 1 is automatically achieved by a recovery operation in an adopted sequence.

The data evaluation subroutine, depicted as a flow chart in FIG. 5, operates to suspend the on-going routine or subroutine and is called for the whenever an automatic recovery of the lifting and carrying apparatus 1 is achieved. The data accumulated in the RAM of the second controller 15B are reduced by failure type in step S10 and then by recovery operation for every type of operational failure in step S11. Thereafter, the second controller 15B computes data of the probability of recovery P, a recovery time T and the number of switch operations N for every sequential recovery operation actually adopted in step S12.

The probability of recovery P is a ratio of successful automatic recovery of the lifting and carrying apparatus by a sequence of recovery operation relative to the total number of recovery operations taken in the sequence. The recovery time T is given as a period of time for which an operational failure is removed by the successful sequence of recovery operation. The number of switch operations N indicates how many times the cylinder actuating switches are operated before the operational failure is removed in the successful sequence of recovery operation.

To evaluate the data for each sequence of recovery operation taken to remove an operational failure, the following algebraic equation is calculated to obtain and store an eventual value of evaluation E in the RAM of the second controller 15B in step S13:

$$E = a_1 \times Pe + a_2 \times Te + Ne$$

wherein $a_1$ to $a_2$ ($a_1 > a_2$) are coefficients and for example, 3 and 2 respectively.

In the above algebraic equation, the probability of recovery P and the recovery time T are differently weighted. It is to be noted that the larger the eventual evaluation value E for a sequence of recovery operation is, the higher the priority of the sequence of recovery operation is. Eventually, the values of points PE, Te and Ne as evaluation parameters are determined depending upon the values of P, T and N, respectively, from the following table:

| P (%)  | Pe | T (sec) | Te | N   | Ne |
|--------|----|---------|----|----|----|
| 100–91 | 10 | 0–5     | 10 | 1   | 10 |
| 90–81  | 9  | 6–10    | 9  | 2   | 9  |
| 80–71  | 8  | 11–15   | 8  | 3   | 8  |
| 70–61  | 7  | 16–20   | 7  | 4   | 7  |
| 60–51  | 6  | 21–25   | 6  | 5   | 6  |
| 50–41  | 5  | 26–30   | 5  | 6   | 5  |
| 40–31  | 4  | 31–35   | 4  | 7   | 4  |
| 30–21  | 3  | 36–40   | 3  | 8   | 3  |
| 20–11  | 2  | 41–45   | 2  | 9   | 2  |
| 10–0   | 1  | 46–     | 1  | 10– | 1  |

When the orders of priority of more than one sequence of recovery operations are determined from the evaluation values E by failure type, data of the orders of priority are stored in the RAM of the second controller 15B in step S14. Thereafter, instruction data for every sequence of recovery operation is formed based on the data reduced in step S11 by failure type and then stored in the RAM of the second controller 15B.

The automatic sequential recovery routine, depicted as a flow chart in FIG. 6, repeatedly operates as long as the lifting and carrying apparatus 1 is in operation. In the automatic sequential recovery operation, the second controller 15B receives a failure signal TS from the first controller 15A to make a decision whether an operational failure is caused in the lifting and carrying apparatus 1 under operation in step 20. If in fact an operational failure is detected, the second controller 15B reads the condition of the automatic recovery mode selection switch 30 to decide whether the automatic recovery mode is selected in step S21. If the answer to the decision is no in either step S20 or S21, the automatic recovery routine repeats steps S20 and S21. On the other hand, when the automatic recovery mode is selected, then the type of the operational failure is recognized according to a failure signal TS in step S22. After the recognition of the type of operations failure, a decision is made in step S23 whether the counted value i of the soft counter in the second controller 15B is not larger than three (3). If the answer to the decision is yes, a recovery operation start (ROS) signal is provided in step S24 for the decision in step S2 in the data collection subroutine called for whenever an operational failure is caused. Thereafter, the second controller 15B reads out instruction data of a sequence of recovery operation having the first order of priority in step S25 and outputs an instruction signal CS representing the read out instruction data to the first controller 15A in step S26 so as to enable the first controller 15B to perform a sequence of recovery operation having the first order of priority. Following to the outputting of the instruction signal CS, a decision is made in step 27: "has the sequence of recovery operation been terminated ?" If in fact the answer to the decision is yes indicating that the sequence of recovery operation has been terminated, then the second controller 15B provides a termination signal to allow itself to make a subsequent decision in step S29. If, on the other hand, the answer is no, steps S25-S27 are repeatedly effected unitl the answer to the decision in step S27 becomes yes.

The decision made in step S29 is with regard to whether the automatic recovery of the lifting and carrying apparatus 1 has been performed. If no automatic recovery of the lifting and carrying apparatus 1 is caused by the automatic sequence of recovery operation, then, the second controller 15B, after changing the count value i of the soft counter by an increment of one (1) in step S30, orders return to step S23. In this manner, the second controller 15B operates to execute one or more automatic sequences of recovery operations in the order of priority so as to remove the recognized type of operational failure. However, if the answer to the decision in step S23 is no indicating that the recovery operation has been repeated three times for the recognized operational failure, then, the second controller 15B outputs an alarm signal to selectively actuate the alarm lamps 21-24 in accordance with the type of operational failure.

Either when the answer to the decision regarding the automatic recovery of the lifting and carrying apparatus 1 is yes or any one of the alarm lamps 21-24 is actuated, the automatic recovery routine orders return to the first decision in step S20 and repeats the first decision until another operational failure is detected.

Because data of various sequential recovery operations manually taken by a skilled operator or operators so as to remove various types of operational failures caused in the lifting and carrying apparatus 1 are increasingly accumulated for the time being after the installation of the lifting and carrying apparatus 1, automatic recovery of the lifting and carrying apparatus 1 can be effected with a sufficiently high reliability from this time on.

It should be noted that various changes and modifications are apparent to those skilled in the art which are within the scope of the invention, and such changes and modifications are intended to be covered by the following claims.

What is claimed is:

1. An automatic normal operation recovery system used in cooperation with a sequentially controlled apparatus having a plurality of actuators which are operated in a predetermined sequence to perform a sequential operation of said sequentially controlled apparatus for automatically removing an operational failure caused in said sequentially controlled apparatus by actuating said actuators, thereby recovering said sequentially controlled apparatus to its normal operating condition, said recovery system comprising;

operational failure detecting means for detecting an occurrence and a type of an operational failure caused in said sequentially controlled apparatus;

actuator operating means for operating said actuators in a sequence suitable for a type of operational failure detected by said operational failure detecting means so as to remove said type of operational failure, thereby recovering said sequentially controlled apparatus to its normal operating condition;

memory means for accumulatively storing data of a type of operational failure detected by said operational failure detecting means and a sequence taken to remove said type of operational failure through said manual recovery means; and automatic recovery means for, when an operational failure is detected by said operational failure detecting means, assigning an order of priority to all sequences available for removing the same type of operational failure as said operational failure detected by said operational failure detecting means accumulatively stored in said memory and automatically actuating said actuator operating means to operate said actuators in a sequence assigned the first order of priority.

2. An automatic normal operation recovery system as defined in claim 1, wherein said actuator operating means is changed between a manual operating mode and an automatic operating mode.

3. An automatic normal operation recovery system as defined in claim 2, wherein said memory means accumlatively stores data of a sequence manually taken when said actuator operating means is in said manual operating mode, or automatically taken when said actuator operating means is in said manual operating mode, to remove an operational failure through said manual recovery means.

4. An automatic normal operation recovery system as defined in claim 3, wherein said automatic recovery means repeats a predetermined number of times said automatic actuation of said actuator operating means unless an operational failure is not removed.

5. An automatic normal operation recovery system as defined in claim 4, wherein said actuator operating means is changed into said manual operating mode when an operational failure is not removed before said predetermined number of times of automatic actuation of said actuator operating means by said automatic recovery means.

6. An automatic normal operation recovery system as defined in claim 1, wherein said automatic recovery means assigns each said sequence an order of priority based on at least one of parameters of a probability of recovery P which is a ratio of the number of successful removals of a same type of operational failure by each said sequence relative to the total number of trials of each said sequence for said same type of operational failure, a recovery time T which is a period of time needed to successfully remove said same type of operational failure by each said sequence, and the number of operations N for actuating said actuators.

7. An automatic normal operation recovery system as defined in claim 6, wherein said order of priority is determined based on an evaluation value E which is calculated by the use of the following algebraic equation for each said sequence:

$$E = Ia_1 \times Pe + a_2 \times Te + Ne$$

wherein $a_1$ and $a_2$ are weighting coefficients and $a_1 > a_2$;

Pe is an evaluation point depending upon said probability of recovery P;

Te is an evaluation point depending upon said recovery time T; and

Ne is an evaluation point depending upon said number of operations N.

8. An automatic normal operation recovery system as defined in claim 7, wherein said evaluation points are given as follows:

| P (%) | Pe | T (sec) | Te | N | Ne |
|---|---|---|---|---|---|
| 100-91 | 10 | 0-5 | 10 | 1 | 10 |
| 90-81 | 9 | 6-10 | 9 | 2 | 9 |

-continued

| P (%) | Pe | T (sec) | Te | N | Ne |
|---|---|---|---|---|---|
| 80–71 | 8 | 11–15 | 8 | 3 | 8 |
| 70–61 | 7 | 16–20 | 7 | 4 | 7 |
| 60–51 | 6 | 21–25 | 6 | 5 | 6 |
| 50–41 | 5 | 26–30 | 5 | 6 | 5 |
| 40–31 | 4 | 31–35 | 4 | 7 | 4 |
| 30–21 | 3 | 36–40 | 3 | 8 | 3 |
| 20–11 | 2 | 41–45 | 2 | 9 | 2 |
| 10–0 | 1 | 46– | 1 | 10– | 1 |

9. An automatic normal operation recovery system as defined in claim 8, wherein said weighting coefficients $a_1$ and $a_2$ are 3 and 2, respectively.

10. An automatic normal operation recovery system as defined in claim 8, wherein the larger said evaluation value E for a sequence is, the higher said order of priority of said sequence is.

* * * * *